United States Patent [19]

Piotrovsky

[11] Patent Number: 4,470,784

[45] Date of Patent: Sep. 11, 1984

[54] INSERT MOLDING APPARATUS AND RETRACTABLE INSERT-MOLDING PIN

[75] Inventor: Ralph K. Piotrovsky, Dana Point, Calif.

[73] Assignee: Mattel, Inc., Hawthorne, Calif.

[21] Appl. No.: 382,868

[22] Filed: May 28, 1982

[51] Int. Cl.³ .......................... B29C 6/02; B29D 3/02
[52] U.S. Cl. .................................... 425/116; 264/274; 264/275; 264/278; 425/117; 425/127; 425/DIG. 57; 446/376
[58] Field of Search ............ 264/254, 255, 278, 328.8, 264/274, 275, 277, 279, 278; 46/161, 163, 151, 156, 162; 249/91, 152, 177, 178; 425/116, 117, 129 R, DIG. 57, 127

[56] References Cited

U.S. PATENT DOCUMENTS

| 1,499,762 | 7/1924 | Conradi | 264/278 |
|---|---|---|---|
| 2,129,421 | 9/1938 | Hales | 46/156 |
| 2,361,348 | 10/1944 | Dickson et al. | 425/116 |
| 3,277,601 | 10/1966 | Ryan | 46/161 |
| 3,284,947 | 11/1966 | Dahl | 46/156 |
| 3,350,812 | 11/1967 | Lindsay et al. | 46/161 |
| 3,363,040 | 1/1968 | Aoki | 264/278 |
| 3,394,490 | 7/1968 | Baxter | 46/163 |
| 3,555,723 | 1/1971 | Kopsch et al. | 46/161 |
| 3,628,282 | 12/1971 | Johnson et al. | 46/161 |
| 3,965,234 | 6/1976 | Lane | 264/275 |

FOREIGN PATENT DOCUMENTS

| 1062920 | 4/1954 | France | 46/162 |
|---|---|---|---|
| 555019 | 5/1977 | U.S.S.R. | |

Primary Examiner—James B. Lowe
Attorney, Agent, or Firm—Ronald M. Goldman; Max E. Shirk; James G. O'Neill

[57] ABSTRACT

A unitary molding insert (24) and pin (27) of the prior art are replaced by an improved molding insert (30) which is provided with a plurality of collapsible pin assemblies (56), each including a unitary hollow, cylindrical boss (58), and a separate piston (60) having a unitary valve (62) and pin (64). Each piston (60) may be inserted in its boss (58) with its valve (62) being seated on the upper edge of the boss (58) and with its pin (64) engaging the inner surface of a mold (84) to maintain the insert (30) in a stable position during the encasing of the insert (30) with a suitable molding material. When the mold is substantially filled to capacity, the pressure created by the molding material will force the piston (60), valve (62) and pin (64) to a recessed position within the boss (58).

6 Claims, 11 Drawing Figures

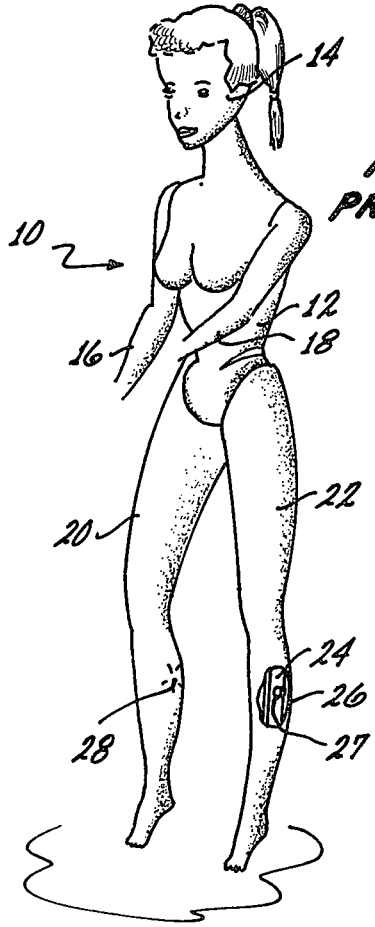
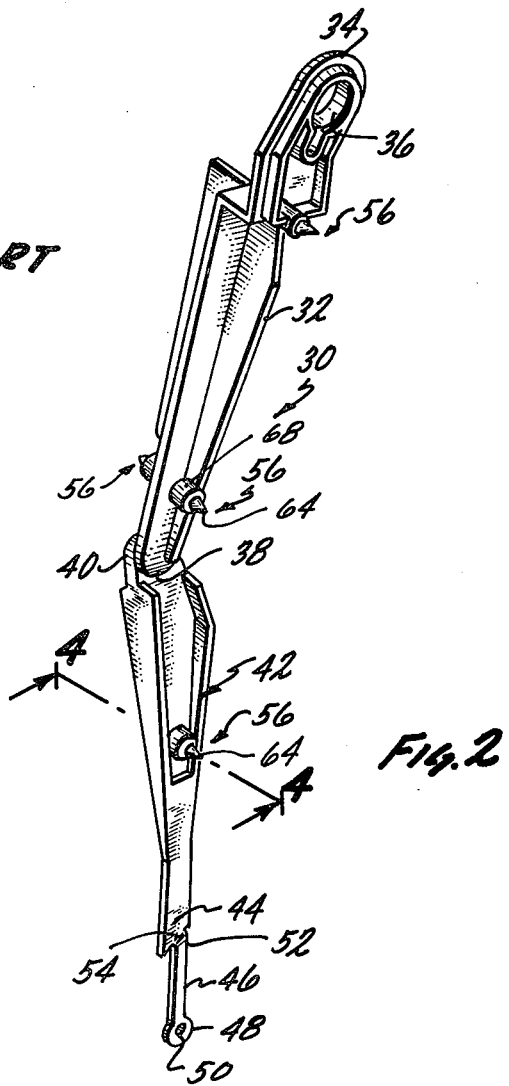
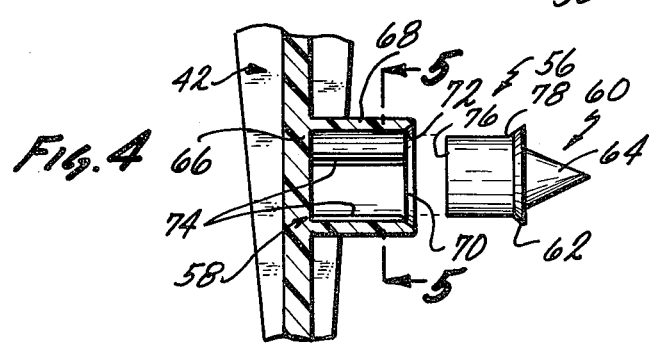

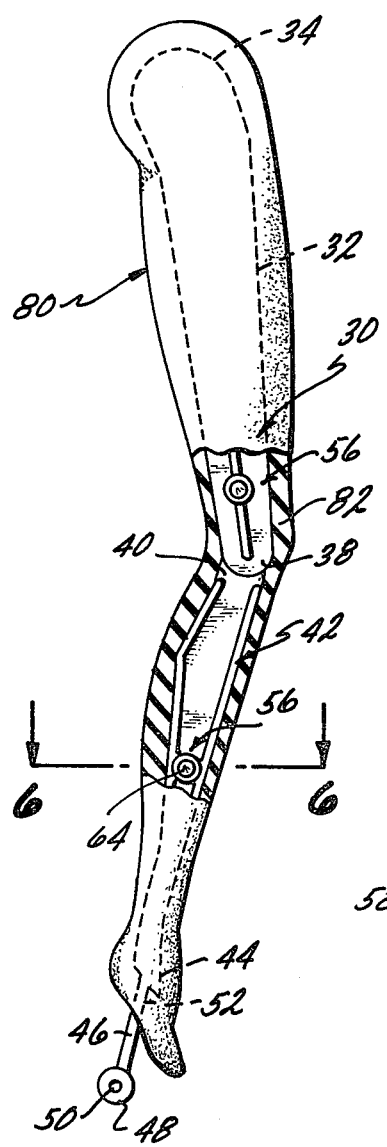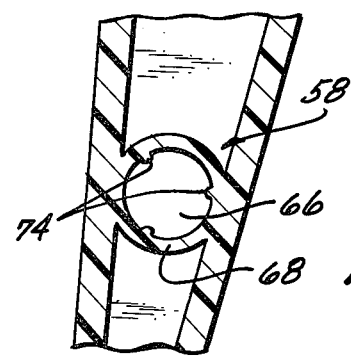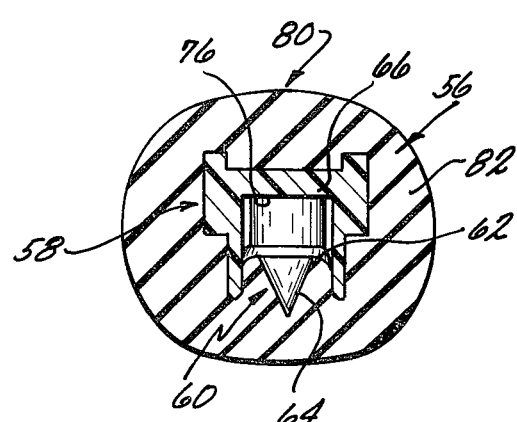

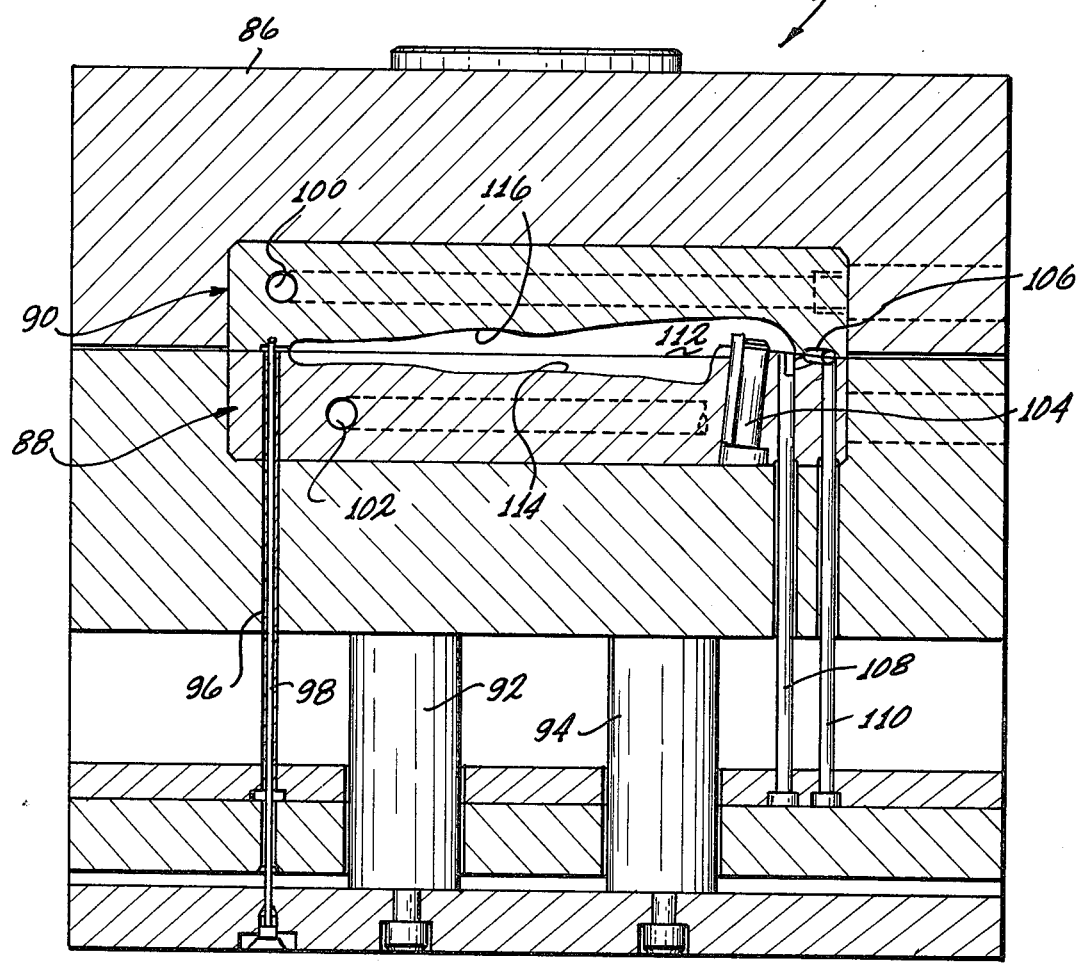

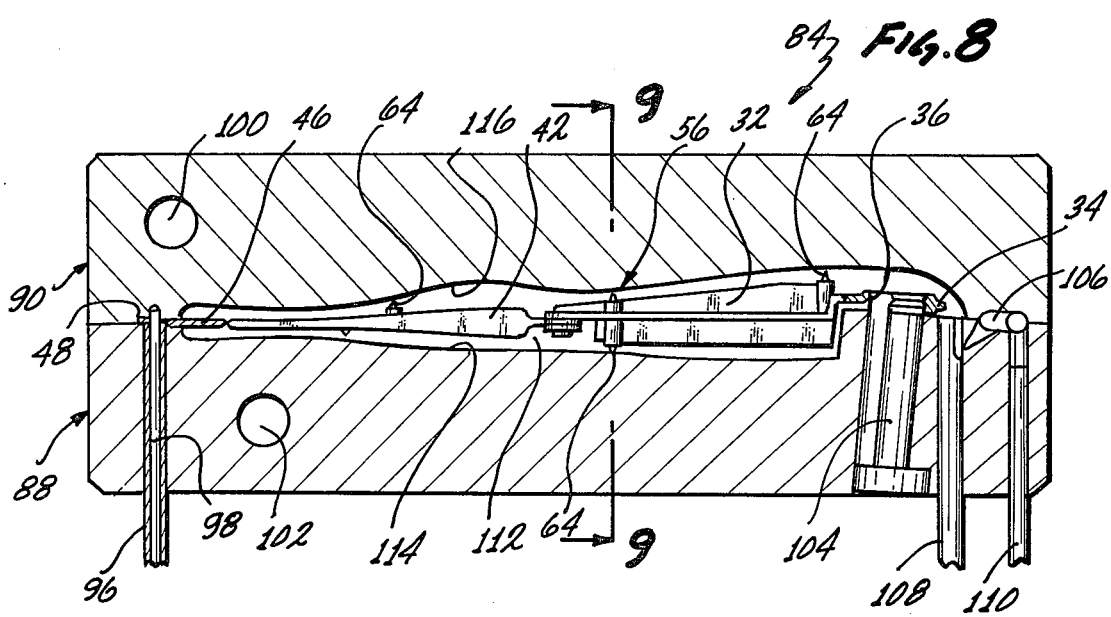
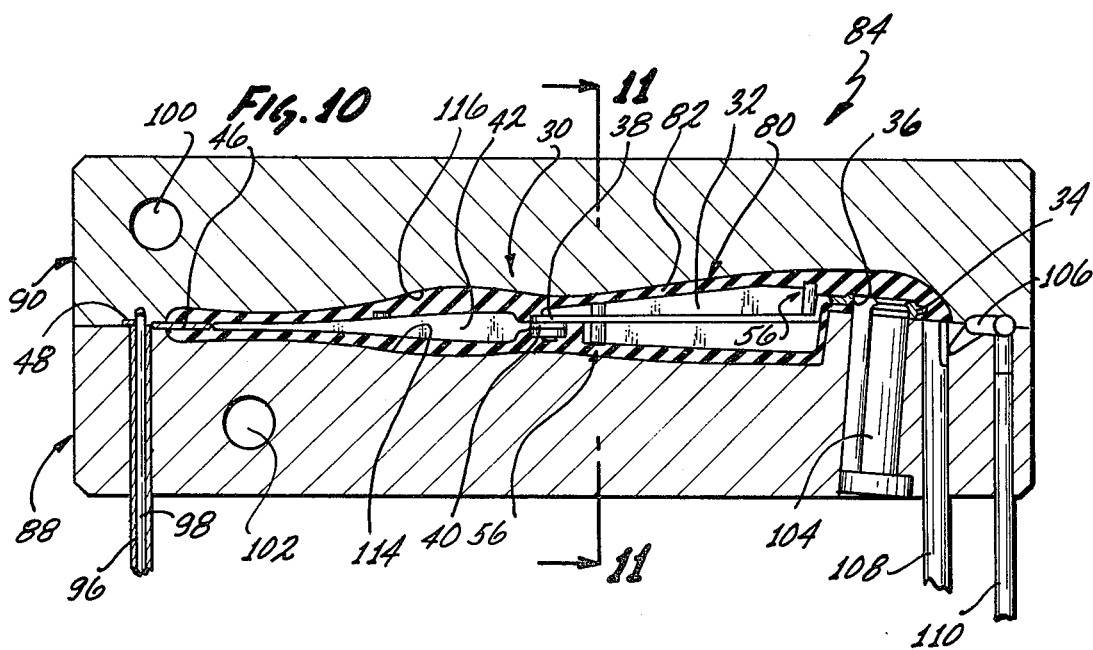

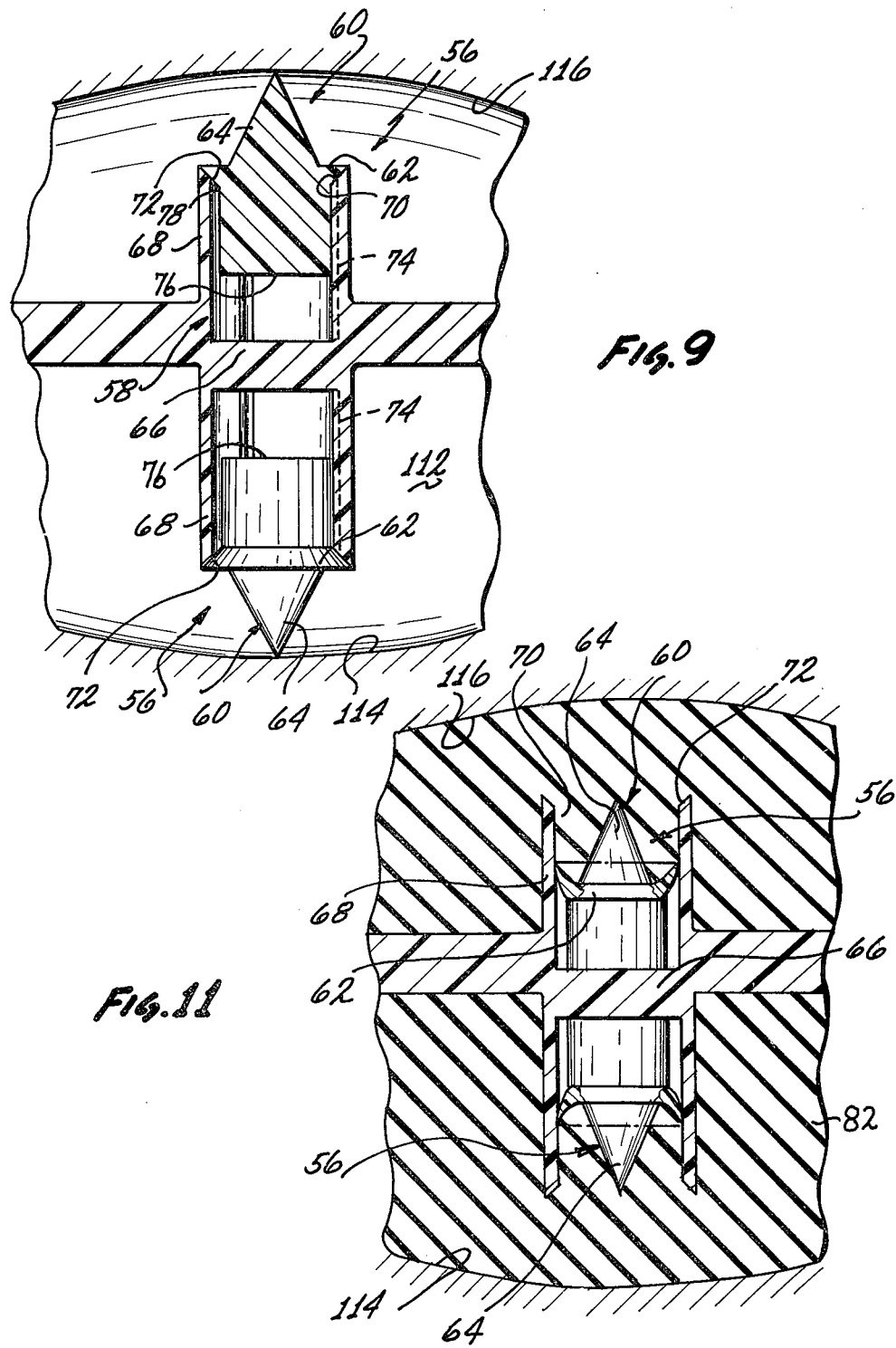

INSERT MOLDING APPARATUS AND RETRACTABLE INSERT-MOLDING PIN

DESCRIPTION

1. Technical Field

The present invention relates to molding inserts and particularly to pins that are employed to hold an insert in stable position within a mold during an insert-molding operation.

2. Background Art

The prior art, U.S. Pat. No. 3,277,601, provides an insert-molding method wherein a product may be made by first injection-molding fairly rigid skeletal parts in a first mold. These parts, which include a plurality of pins, are articulately connected together to form an "armature". This armature is then positioned in a second mold with the pins touching the inner surface of the mold to maintain the armature in proper position while a fairly soft polyvinylchloride (PVC) material (or the like) is forced into the second mold to encase the armature. This soft material just barely covers the tips of the pins and is sometimes ruptured by the pins. Additionally, the pins often show through the soft skin giving the product a poor appearance.

DISCLOSURE OF THE INVENTION

According to the method and apparatus of the present invention, the pins are retracted or collapsed away from the inner surface of the second mold as soon as the second mold is substantially filled to capacity. This results in a finished product having the pins recessed sufficiently below the surface of the material encasing the armature to eliminate the problems of pin ruptures and poor appearance.

BRIEF DESCRIPTION OF DRAWINGS

The details of the present invention will be described in connection with the accompanying drawings, in which:

FIG. 1 is a perspective view of a prior art doll;

FIG. 2 is a perspective view of a molding insert of the present invention;

FIG. 3 is a side elevational view, with parts broken away to show internal construction, of the insert of FIG. 2 encased by a suitable molding material;

FIG. 4 is an enlarged, partial cross-sectional view taken along line 4—4 of FIG. 2;

FIG. 5 is a partial cross-sectional view taken along line 5—5 of FIG. 4;

FIG. 6 is an enlarged, partial cross-sectional view taken along line 6—6 of FIG. 3;

FIG. 7 is a cross-sectional view of a mold which may be used in practising the present invention;

FIG. 8 is an enlarged, partial cross-sectional view of the mold of FIG. 7 with an insert of the present invention in position in the mold cavity;

FIG. 9 is an enlarged, partial cross-sectional view taken along line 9—9 of FIG. 8;

FIG. 10 is a view similar to FIG. 8 showing the relationship of the insert and encasing material when the mold is substantially full of the encasing material; and FIG. 11 is an enlarged, partial cross-sectional view taken along line 11—11 of FIG. 10.

BEST MODE FOR CARRYING OUT THE INVENTION

Referring again to the drawings and more particularly to FIG. 1; a prior art doll 10 includes a torso 12, a head 14, a pair of arms 16, 18 and a pair of legs 20, 22. As shown for leg 22, each leg includes a molding insert serving as a skeletal member of armature 24 which may be encased in a suitable molding material 26 by an insert-molding operation. Suitable pins, like the one shown at 27, are provided on armature 24 for maintaining it in a stable position in a mold (not shown) during the insert molding operation. As is known to those skilled in the art, the top of pin 27 is just barely covered with the encasing material. This results in unsightly blemishes, like the one shown on leg 20 at 28.

Referring now to FIGS. 2, 4 and 5, an insert of the present invention, generally designated 30, is shown herein for purposes of illustration, but not of limitation, as comprising an armature for a doll leg. Insert 30 includes an upper member 32 having an upper end 34, which is provided with an aperture 36, and a lower end 38, which is articulately connected to the upper end 40 of a lower member 42. Member 42 includes a lower end 44 from which a removable, mold-positioning tab 46 depends. Tab 46 includes a lower end 48, which is provided with an aperture 50, and an upper end 52, which is connected to member 42 by a weakened section 54.

Insert 30 also includes a plurality of collapsible pin assemblies 56 each including a hollow, cylindrical boss 58 (FIG. 4), a piston 60, a valve 62 and a pin 64. Boss 58 is preferably formed integrally with insert 30 when insert 30 is molded from a suitable polymeric material, such as an acetal resin or the like. Boss 58 includes a lower, closed end 66, an encompassing sidewall 68 and an open top 70. A valve seat 72 is provided on sidewall 68 at open top 70 and a plurality of air-relieving guides or splines 74 are provided on the inner surface of sidewall 68. Splines 74, which may be three in number, extend from closed bottom 66, along the major axis of sidewall 68, to a position closely adjacent valve seat 72. Piston 60 includes a lower end 76 and an upper end 78. Valve 62 is provided on the upper end 78 of piston 60 and is adapted to seat on valve seat 72, as shown in FIG. 9. Pin 64 is conical in shape and extends upwardly from valve 62. Piston 60, valve 62 and pin 64 may be molded as a unitary member from an acetal resin or the like.

It will be noted from FIGS. 9 and 11 that the diameter of piston 60 is less than the inside diameter of boss 58 and that the length of piston 60 is less than the depth of boss 58, whereby piston 60, valve 62 and pin 64 may be made to move from their FIG. 9 positions to their FIG. 11 positions in a manner to be hereinafter described.

During such movement, piston 60 is guided by splines 74 and trapped air is forced out of boss 58 along a path lying between piston 60 and sidewall 68.

Referring now to FIGS. 3 and 6, insert 30 may be advantageously used to make a doll limb 80 by placing insert 30 in a mold, to be hereinafter described in detail, and filling the mold with a suitable molding material, such as polyvinylchloride (PVC) or the like, to encase insert 30 in a soft skin 82. When the mold is substantially full of the molding material, the pressure thus created will move the collapsible pin assembly 56 to the position shown in FIG. 6 where it will be noted that pin 64 is recessed into insert 30 and the pointed end of pin 64 is well beneath the outer surface of skin 82.

Referring now to FIGS. 7, 8 and 10, limb 80 may be made in a mold assembly 84, including a mold base 86, a core insert 88, a cavity insert 90 and a pair of supporting pillars 92, 94. Mold assembly 84 also includes an ejector sleeve 96, in which a core pin 98 is mounted, a pair of water inlets 100, 102, a locating pin 104, a gate 106 and a pair of ejector pins 108, 110. Mold 84 also includes a cavity 112 formed by the inner wall 114 of core insert 88 and the inner wall 116 of the cavity insert 90.

Insert 30 may be prepared for use in mold 84 by first assembling collapsible pin assembly 56, as indicated in FIG. 4. Cavity insert 90 may then be separated from core insert 88 and insert 30 may be loaded into cavity 112 by engaging aperture 50 over core pin 98 and aperture 36 over locating pin 104. Cavity insert 90 may then be locked into position whereupon pins 64 will engage an associated one of the inner walls 114, 116 to maintain insert 30 in a stable position within cavity 112.

Cavity 112 may then be filled with the molding material through gate 106 to encase insert 30 in skin 82, as shown in FIG. 10.

Referring now to FIGS. 9 and 11, when cavity 112 is empty, pins 64 engage an associated one of the inner walls 114, 116 with valves 62 seated on valve seats 72 and with the lower ends 76 of pistons 60 elevated above the closed end 66 of boss 58. When leg cavity 112 is filled to capacity, the pressure created by the molding material will collapse pin assemblies 56 to the recessed positions shown in FIG. 11 wherein the pointed ends of pins 64 are positioned well beneath the outer surface of skin 82.

It takes about 1 second to fill the mold and collapse the pins. The material in the mold then holds insert 30 in the correct position while gate 106 is left open for about 6 seconds to pack the mold; this eliminates voids in soft skin 82. Skin 82 is then cured in the mold for about 15 seconds while water is circulated around the mold cavity in well known manner.

While the particular insert-molding method and retractable insert-molding pin herein shown and described in detail are fully capable of attaining the objects and providing the advantages hereinbefore stated, it is to be understood that they are merely illustrative of the presently preferred embodiment of the invention and that no limitations are intended to the details of construction or design herein shown other than as defined in the appended claims, which form a part of this disclosure.

Whenever the term "means" is employed in these claims, this term is to be interpreted as defining the corresponding structure illustrated and described in the specification or the equivalent of the same.

I claim:

1. In combination with an insert for an insert-molding operation of the type wherein said insert becomes encased by a molding material, said insert including a plurality of pins engageable with the inner surface of a mold for maintaining said insert in position within said mold during said insert-molding operation, the improvement which comprises:

means for retracting said pins away from said inner surface of said mold and recessing said pins into said insert upon completion of said insert-molding operation, whereby said pins are positioned beneath the outer surface of said molding material.

2. In combination with an insert for an insert-molding operation, said insert including a plurality of pins with the inner surface of a mold for maintaining said insert in position within said mold during said insert-molding operation, the improvement which comprises:

means for retracting said pins away from said inner surface of said mold upon completion of said insert-molding operation, said retracting means including:

a hollow boss provided on said insert for each of said pins, each of said bosses having an open end;

a piston slidably mounted in the open end of each of said hollow bosses, each of said pins being provided on one of said pistons; and a valve carried by each of said pistons for sealing the open end of an associated one of said bosses, said pistons being forced into a recessed position in their bosses by the pressure generated within said mold during said insert-molding operation.

3. A retractable pin for a molding insert, comprising:

a hollow boss provided on said insert, said boss having an encompassing sidewall, an open top and a closed bottom;

a plurality of splines uniformly spaced about the inner surface of said sidewall along the major axis thereof;

a piston positioned in the open top of said boss in sliding engagement with said splines, the length of said piston being less than the length of said boss, whereby said piston may be recessed into said boss, said piston having an upper end and a lower end;

a valve member encompassing said upper end of said piston for sealing said open top; and a pin projecting upwardly from said valve member for holding said insert in a stable position in a mold during a molding operation including the step of injecting molding material into said mold until said mold is substantially full, whereupon the force exerted by said molding material recesses said piston into said boss.

4. A retractable pin as recited in claim 3 wherein said molding insert is a skeletal part in a doll limb.

5. A retractable pin as recited in claim 3 wherein said molding material is a soft polyvinylchloride material.

6. In combination with a doll limb including a skeletal armature and a soft pliable material covering said armature, the improvement which comprises:

at least one pin provided on said armature for maintaining said armature in stable position in a mold during the filling of said mold with said pliable material; and means carried by said pin for retracting said pin from said mold and recessing said pin into said armature when said mold is substantially full of said pliable material.

* * * * *